Feb. 15, 1966  F. FIORINI  3,235,862
DIGITAL AND ANALOG CONVERTER
Filed March 8, 1962  3 Sheets-Sheet 1
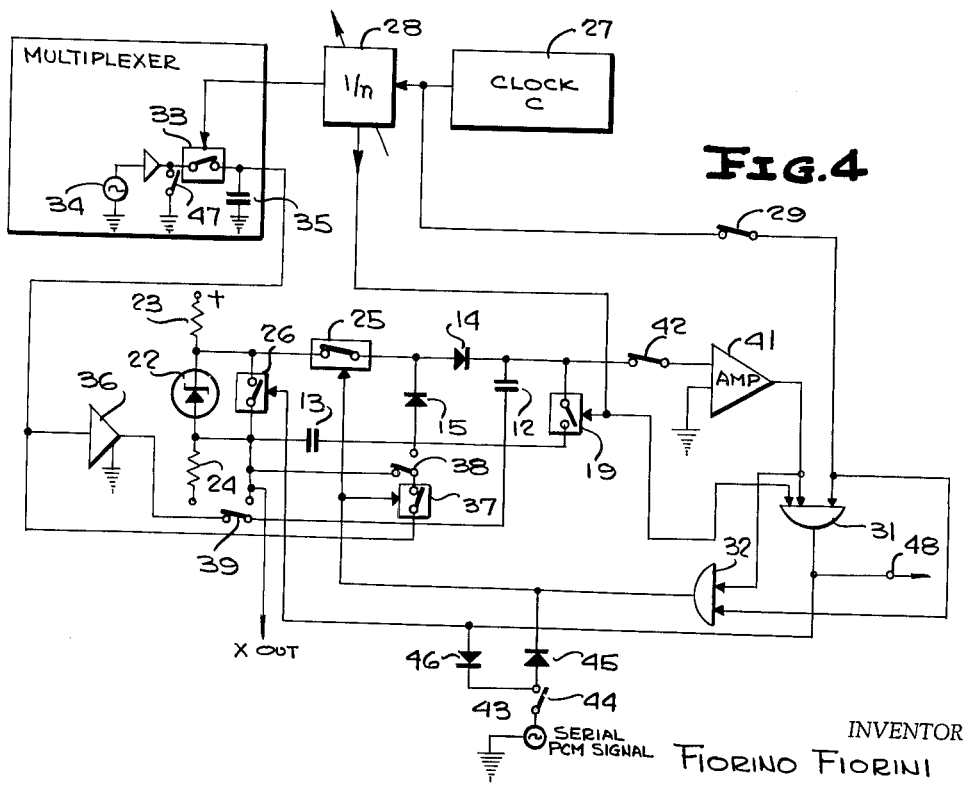
INVENTOR
FIORINO FIORINI
BY Hurvitz & Rose
ATTORNEYS Feb. 15, 1966        F. FIORINI        3,235,862
DIGITAL AND ANALOG CONVERTER
Filed March 8, 1962        3 Sheets-Sheet 2
FIG.5
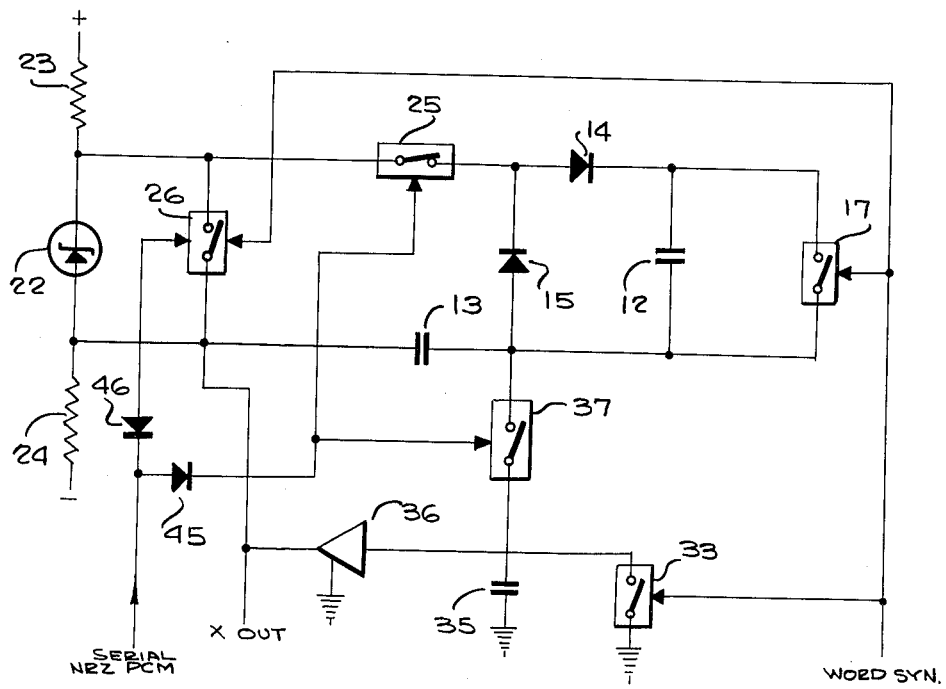
FIG.6
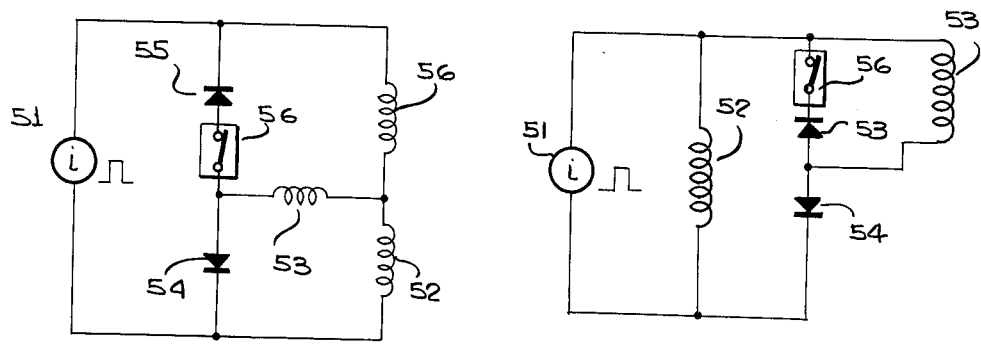
FIG.7
INVENTOR
FIORINO FIORINI
BY *Hurvitz & Rose*
ATTORNEYS Feb. 15, 1966  F. FIORINI  3,235,862
DIGITAL AND ANALOG CONVERTER
Filed March 8, 1962  3 Sheets-Sheet 3
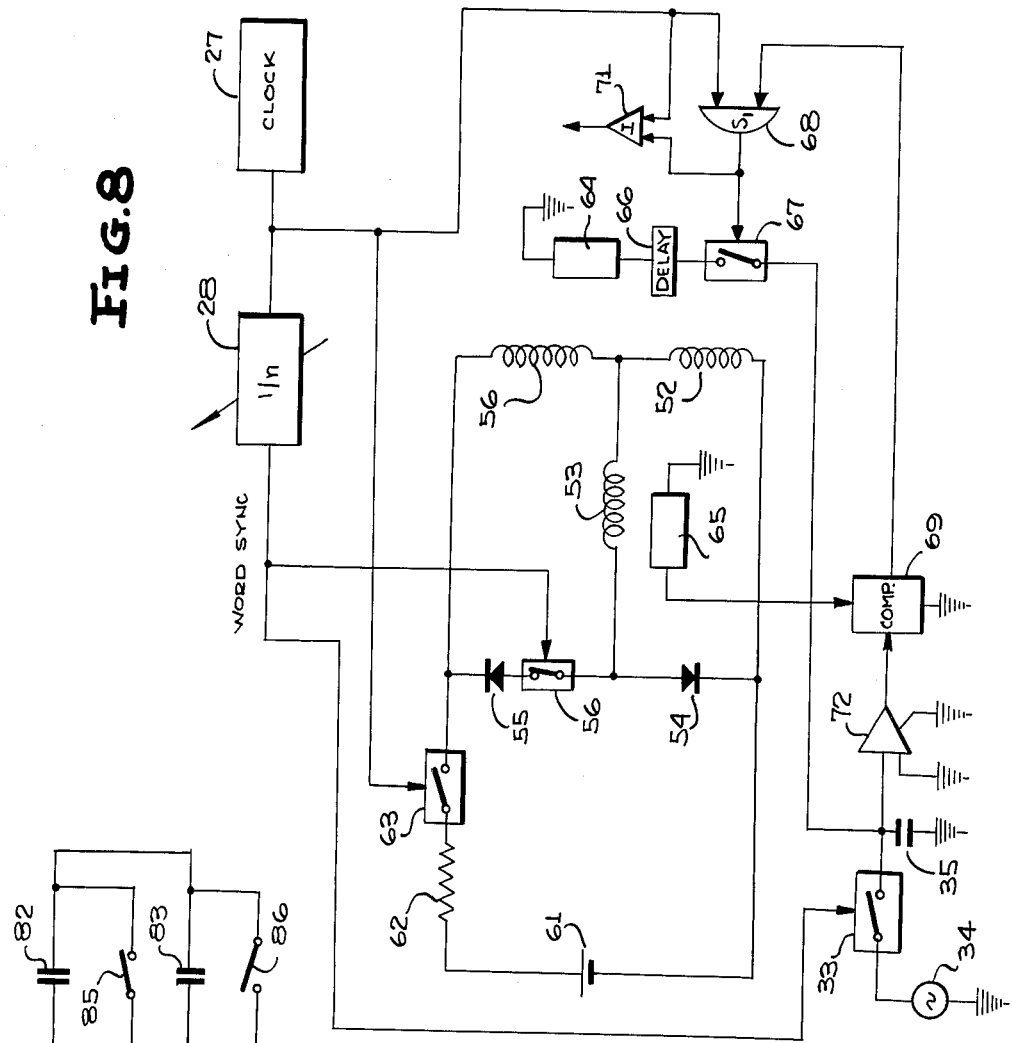
INVENTOR
FIORINO FIORINI
BY Hurvitz & Rose
ATTORNEYS United States Patent Office 3,235,862
Patented Feb. 15, 1966

3,235,862
DIGITAL AND ANALOG CONVERTER
Fiorino Fiorini, Melbourne, Fla., assignor to Radiation Incorporated, Melbourne, Fla., a corporation of Florida
Filed Mar. 8, 1962, Ser. No. 178,383
23 Claims. (Cl. 340—347)

The present invention relates generally to analog and digital converters and more particularly to analog and digital converters employing a circuit, including a plurality of reactances, for dividing the energy derived from a source of constant amplitude pulses.

Converter circuits employing loaded resistance networks have been widely utilized in the past in analog to digital and digital to analog converters but have generally suffered from the use of a multiplicity of parts and slow speeds. In consequence, many previous converters have been of large physical dimensions, have required significant amounts of input power, and have not been highly reliable because of the many components employed. Because of their slow speeds, the prior resistive type converters have not been suited to many purposes wherein high frequency input and output information is required.

A converter employing capacitors has been developed but also has certain shortcomings. The previously developed capacitor converter employs a function generator wherein voltages are developed across a pair of capacitors, which voltages decrease in decreasing increments as time progresses. This function generator requires three high grade capacitors, two of which must store their charges for relatively long time periods.

The present invention employs a function generator requiring only a pair of reactances for dividing the energy from a constant amplitude pulse source. Between pulses, energy is removed from one of the reactances while the other reactance stores the energy which it received from the preceding pulse. Upon the occurrence of pulses subsequent to the first, the energy supplied to the circuit is reduced by a predetermined ratio, dependent upon the relative sizes of the two reactances. This decrease in net energy supplied by the source to the circuit results from the stored energy in one of the reactances. Because of the reduced net energy applied to the circuit from the source the energy applied to the reactance which had its energy removed is reduced by a predetermined amount over the amount applied to it during the previous cycle. Conversely, the energy stored in the other reactance is increased by the predetermined amount.

The reactances in this basic circuit may take the form of either inductor or capacitor elements. When the reactances are capacitors, they are connected in series with a voltage source of constant amplitude to divide the voltage from the source. A pair of diodes are coupled to the capacitors to effect charging and discharging thereof in response to the presence or absence of a voltage pulse. In another embodiment of the present invention, current dividing inductors are employed as the reactances. The inductors are connected in parallel with a source of constant amplitude current pulses and are connected with a pair of diodes. The diodes are arranged so that the current level in one of the inductors is maintained substantially constant bewteen current pulses while the current in the other inductor is reduced to zero between current pulses.

The inductor circuit may be modified to include a further inductor in series with the current dividing inductors. The further inductor is connected in parallel with the diode which maintains the current level in inductor in which the current is maintained substantially constant between pulses. This compensates for the voltage drop across the diode.

The function generator circuit is employed in an analog to digital converter by comparing the amplitude of the analog input signal with the energy stored in the reactance which increases its energy level as the pulses are derived. When the energy in the storing reactance is greater than the analog signal level, a binary zero is derived for the bit corresponding to the pulse which was applied to the circuit upon the occurrence of a clock pulse. A binary one is derived when the opposite conditions prevail relative to the analog signal and the energy stored. When a binary zero is derived, the energy stored in the non-storing reactance is transferred and added to the analog input signal. This increases the analog input signal by an amount commensurate with the energy stored in the non-storing reactance. When the next bit in the word is generated, the increased analog input signal level is compared with the energy level in the storing reactance and a one or zero digital signal is derived.

Upon completion of a word containing a predetermined number of clock pulses, the energy is completely removed from the storing reactance. When the reactances are capacitors, this is accomplished by short circuiting the capacitor to discharge the voltage stored therein. When the reactances are inductors, however, the stored current energy in the inductor is removed by open circuiting the discharge path.

The basic circuit is employed as a digital to analog converter by controlling the rate of pulses applied to the circuit in accordance with the zeros and ones of the digital signal. The pulses are applied to the circuit upon the occurrence of each binary zero or one input signal. This results in the normal charge and discharge cycle of the two reactances in the circuit. The reactance which is discharged between each pulse is arranged to apply its energy to a storage element only when a one occurs in the input digital signal. This results in the accumulation of energy in the storage element commensurate with the analog signal output desired. After a predetermined number of binary zero or one input signals have occurred, the storage element signal is erased to enable it to be activated during the next word. As in the analog to digital converter, the number of bits in a word is controllable.

When the basic circuit is of the capacitor variety, transfer of energy in both analog to digital and digital to analog circuits from the non-storing capacitor is accomplished by a unity gain amplifier. The unity gain amplifier has the charging and discharging capacitor connected between its input and output terminals and a storage capacitor connected to its input terminals. In the analog to digital converter, the same storage condenser is connected to the input of the amplifier to hold and sample the value of the analog input during each word. By utilizing a novel switching arrangement, the basic circuit, the unity gain amplifier, and the storage condenser may be employed as either the analog to digital or digital to analog converter. Thus the system of the present invention is capable of performing a dual function with minimum of parts and effort on the part of an operator.

It is an object of the present invention to provide a new and improved analog and digital converting system employing a function generator which includes a pair of energy dividing reactances which are responsive to a constant amplitude pulsating source.

It is another object of the present invention to provide a new and improved analog to digital converter employing a plurality of reactive elements.

It is another object of the present invention to provide a new and improved digital to analog converter employing a plurality of reactive elements.

It is a further object of the present invention to provide a new and improved analog and digital converter wherein the number of bits in a word is easily controlled.

It is another object of the present invention to provide a new and improved analog to digital or digital to analog converter system wherein the same elements of the circuit are utilizable in both types of converters.

It is still another object of the present invention to provide a new and improved system which may be switched from an analog to digital converter to a digital to analog converter wherein common parts of the converter are employed.

It is another object of the present invention to provide a function generator for deriving a signal progressively increasing in amplitude by predetermined decreasing increments wherein only a pair of reactive elements are necessary.

It is still another object of the present invention to provide a system for deriving with a pair of parallel connected inductors a signal progressively increasing in amplitude by predetermined decreasing increments, which system employs a pair of diodes and the voltage drop across one of the diodes is compensated by a further inductor connected in series with the said pair of inductors and in parallel with the diode.

It is another object of the present invention to provide a new and improved system for deriving signals progressively increasing or decreasing in amplitude by predetermined decreasing increments, which system employs a multiplicity of capacitors series connected with a source of constant amplitude voltage pulses.

The above and still further objects, features and advantages of the present invention will become apparent upon consideration of the following detailed description of one specific embodiment thereof, especially when taken in conjunction with the accompanying drawings, wherein:

FIGURE 1 is a circuit diagram of the basic capacitor function generator of the present invention;

FIGURES 2A–2C are time vs. amplitude plots of various voltages derived in the circuit of FIGURE 1;

FIGURE 3 is a circuit diagram of a modification of the circuit of FIGURE 1;

FIGURE 4 is a schematic diagram of the analog to digital and digital to analog system employing capacitors in accordance with the present invention, wherein the connections are shown for the analog to digital converter;

FIGURE 5 is a schematic diagram of the circuit of FIGURE 4 when it is connected as a digital to analog converter;

FIGURE 6 is a circuit diagram of another embodiment of the present invention employing inductors as the reactive elements;

FIGURE 7 is a circuit diagram of a modification of the circuit of FIGURE 6;

FIGURE 8 is a schematic diagram of an analog to digital converter employing the circuit of FIGURE 7; and FIGURE 9 is a circuit diagram of a further capacitor function generator according to the present invention.

Reference is now made to FIGURE 1 of the drawings which illustrates a source 11 of constant amplitude voltage pulses which supplies a series circuit including capacitors 12 and 13 connected across the opposite terminals thereof. Between pulses the voltage of source 11 is zero. Connected to one terminal of capacitor 12 and the positive terminal of source 11, is a diode 14 poled to pass the voltage pulses to the series circuit including capacitors 12 or 13. A further diode 15 is connected to the junction of capacitors 12 and 13, the anode of diode 14, and the positive terminal of source 11.

Upon the occurrence of the first voltage pulse 16, FIGURE 2A, the energy is divided equally between capacitors 12 and 13 and the voltages across them jump to $E/2$, provided capacitors 12 and 13 are of equal magnitude. When the first voltage pulse terminates, the voltage across source 11 drops to zero, and capacitor 13 discharges through diode 15 as illustrated by waveform 17, FIGURE 2B. However, there is no discharge path for capacitor 12 when the voltage between the terminals of source 11 is zero because of the direction in which diodes 14 and 15 are poled. Accordingly, the voltage across capacitor 12 remains at $E/2$ until the next pulse of source 11 occurs. Upon the occurrence of the next pulse, the net charge delivered to the circuit by source 11 is only one-half of what it was during the first pulse since the charge in capacitor 12 acts as a bucking voltage. In consequence, the voltages across capacitors 12 and 13 increase only by one-half of what they increased during the previous pulse. Thus, the voltage across capacitor 13 becomes $E/4$ and the voltage across capacitor 12 increases to $¾E$. Upon completion of the second voltage pulse, capacitor 13 is again discharged to zero volts and capacitor 12 retains a charge across it commensurate with the voltage $¾E$. The third voltage pulse results in capacitor 12 being charged to $⅞E$ and capacitor 13 being charged to $⅛E$. Upon completion of the number of pulses or bits in a digital word, switch 19 is closed thus returning capacitor 12 to its initial, uncharged condition. The circuit is then adapted for the generation of a new word.

It is to be understood that many different geometric series may be obtained by utilizing the function generator of FIGURE 1 simply by properly choosing the proper values for capacitors 12 and 13. The voltage across capacitor 12, $V_{12}$ equals $$A \times E[1+(1-A)+(1-A)^2 \ldots +(1-A)^i]$$

and the voltage across capacitor 13, $V_{13}$ equals $E(1-A)^i$ where the index $i$ indicates the number of pulses applied to the circuit and $$A \text{ equals } \frac{C_{12}}{C_{12}+C_{13}}$$

To derive other types of geometric waveforms, the circuit of FIGURE 3 is provided. The circuit of FIGURE 3 is substantially identical to that of FIGURE 1 except for the inclusion of capacitor 21 between the positive terminal of source 11 and the common connection of diodes 14 and 15. This capacitor is included in the circuit to vary the charge ratio between capacitors 12 and 13 in response to the voltage pulses of source 11. By providing output terminals across each of the capacitors 12, 13 and 21, it is possible to derive separate waveforms having a predetermined geometric relationship with the maximum amplitude of pulse source 11.

The derivation of voltages having relationships proportional to $$\frac{1}{(1+A)^i} \text{ and } \sum_1^i \frac{A}{(1+A)^i}$$

is accomplished with the circuit of FIGURE 9. A constant voltage source 81 is connected in series circuit with capacitors 82 and 83, and switch 84. Connected in parallel with capacitors 82 and 83 are switches 85 and 86, respectively. Switch 85 is closed when switch 84 is open so that the charge on capacitor 82 is removed between successive applications of energy to the circuit by battery 81. Switch 86 closes to discharge capacitor 83 at the same time that switch 84 is closed only once during each word, i.e. switch 86 is closed only once every N closures of switch 84, where N is the word rate of the system. When switch 84 is first closed, the current supplied by source 81 is divided between capacitors 82 and 83, the capacitors charge accumulation being dependent on their values. When switch 84 is open, capacitor 82 is discharged and capacitor 83 retains its charge. Sequential operation of the switches results in voltages being generated in accordance with the above formulas, where $$A = \frac{C_{82}}{C_{83}}$$

and $i$ is the number of switch 84 closures. If $$C_{82} = C_{83}, V_{C_{82}} = \frac{E}{2}i$$

and $$V_{C_{83}} = \sum_{1}^{i} \frac{1}{2}i$$

where E is the magnitude of voltage source 81. In utilizing the circuit of FIGURE 9 in an analog to digital or digital to analog converter, capacitors 83 and 82 are substituted for capacitors 12 and 13, respectively, FIGURE 1.

Reference is now made to FIGURE 4 of the drawings which illustrates the manner in which the circuit of FIGURE 1 is interconnected as an analog to digital or digital to analog converter with switching provisions between the two types of converters. The voltage pulses for the series circuit including equal value capacitors 12 and 13 are derived from a power supply having its positive terminal connected to the cathode of Zener diode 22 via resistor 23 and its negative terminal connected to the anode of Zener diode 22 via resistor 24. The positive terminal of the supply is connected via normally closed switch 25 to the junction of diodes 14 and 15. Zener diode 22 is directly connected across normally open switch 26 and has its cathode connected to one terminal of capacitor 13.

Timing control for the converter is accomplished by means of clock pulse source 27 which is coupled to frequency divider 28 which may be manually controlled. The frequency divider 28 serves to properly divide the bits generated by clock 27 into the required word rate for the system.

The system of FIGURE 4 is illustrated with the switches in the analog to digital converter position. Under such conditions, the clock bits from source 27 are supplied via switch 29 to the input terminals of switches 31 and 32 from whence they may be applied to switches 26 and 25, respectively. The word sync pulses derived from divider 28 are applied in parallel to switch 19 and gate 31. The pulses applied to switch 19 close that switch to discharge capacitor 12 after each digital word. The pulses from divider 28 applied to gate 31 inhibit the application of clock pulses to switch 26 via the gate.

The output of divider 28 activates normally open switch 33 which then couples the analog input signal source 34 to sample and hold capacitor 35 once each word. The voltage across capacitor 35 is coupled to the input terminals of unity gain amplifier 36 as is the voltage at one contact of switch 37. The other contact of switch 37 is connected via switch 38 to the negative terminal of the power supply constituted by diode 22, and resistors 23 and 24. The output terminal of amplifier 36 is coupled through switch 39 to the junction between capacitors 12 and 13. The input of amplifier 41, is connected to the junction between capacitor 12 and diode 14 via switch 42 and supplies its output to the input terminals of switches 31 and 32.

When the system is switched to a digital to analog converter, the zero and one bits from the serial, pulse code modulated signal source 43 are coupled via switch 44 to the anode and cathodes of diodes 45 and 46, respectively. The diodes 45 and 46 are arranged so that positive, or binary one pulses from source 43 are coupled to activate switches 37 and 25 while negative or binary zero pulses are coupled through diode 46 to activate switch 26. It is to be understood that the serial pulse code modulation signal 43 is synchronized with clock pulse 27 in external circuitry, not shown. Switches 29 and 42 are open while the digital to analog function is performed so that clock pulses derived from source 27 and the voltage across capacitor 12 have no effect on switches 31 and 32 and amplifier 41. Switches 38 and 39 are reversed from the position illustrated in the drawings so that the polarity of the voltage applied by capacitor 13 across the input and output terminals of amplifier 36 is reversed from the analog to digital state. Also, switch 47 is closed so that capacitor 35 is short-circuited when a word pulse is derived from frequency divider 28.

With the switches of FIGURE 4 in the position illustrated in the figure, the circuit functions as an analog to digital converter in the following manner. The amplitude of analog source 34 is sampled and stored on capacitor 35 once during each word, when an output pulse is derived from divider 28. During the period of time between the word sync pulse, and the next clock pulse, capacitors 12 and 13 are charged to one-half the voltage which Zener diode 22 maintains regulated across the terminals of switch 26. The output voltage of amplifier 36, equal to the voltage storage across capacitor 35, is now added to the voltage stored in capacitor 12.

The analog signal voltage applied to capacitor 35 is of opposite polarity to the voltage stored in capacitor 12. Thus, if the voltage magnitude across capacitor 12 exceeds the voltage magnitude against capacitor 35, a positive voltage is applied to the input of amplifier 41 relative to ground. A negative voltage at the input to amplifier 41 results if the opposite conditions relative to the input and capacitor voltages prevail. If the input to amplifier 41 is negative, when the first clock pulse in the word is generated, a positive, output is derived from switch 31 and applied to switch 27 and output terminal 48. This output pulse closes switch 27 to discharge the capacitor 13 while permitting capacitor 12 to remain charged to $E/2$. The occurrence of the pulse indicates that the analog voltage applied to capacitor 35 is greater than $E/2$ so that a binary one is derived at terminal 41.

If the signal applied to amplifier 41 is positive when the first clock pulse occurs in a word, switch 31 remains closed while switch 32 passes the clock pulse to switches 25 and 37. Closing of switch 37 results in the charge across capacitor 13 being transferred to capacitor 35. If the capacitors 35 and 13 are of equal magnitude, the voltage of capacitor 35 is increased by an amount equal to the voltage across capacitor 13. Switch 25 must be opened under such conditions to remove the remainder of the function generating circuit from the feedback path of amplifier 36. All of the charge on capacitor 13 is then removed and applied to capacitor 35 because capacitor 13 is connected between the input and output terminals of unity gain amplifier 36 which maintains these terminals at the same potential. Since charge must be conserved in a circuit, the charge has no other place to go than capacitor 35. By transferring the charge of capacitor 13 to capacitor 35, the analog input signal applied to the input terminals of amplifier 36 is increased by $E/2$.

When switch 25 closes, and a second voltage pulse of magnitude E is applied to the circuit, capacitors 12 and 13 have their voltages increased by $E/4$ as described supra in connection with FIGURE 1. When the next clock pulse occurs, the input voltage of amplifier 41 is again ascertained as positive or negative to control switching of gates 31 and 32. If the voltage added to capacitor 35 from the previous pulse was of insufficient magnitude to cause the input of amplifier 41 to be negative, switch 32 again passes a clock pulse from source 27 and a binary zero is once again derived at output terminal 48. This operation is continued for the predetermined number of clock pulse bits in a particular word.

Upon the completion of a word, output signals are derived from divider 28 and are applied to switches 19 and 31. The pulse applied to switch 19 completely discharges capacitor 12 while the pulse applied to switch 31 enables a simultaneous clock pulse to be applied to switch 26 to remove the charge on capacitor 13 and thereby restore both capacitors to their initial, uncharged conditions.

Reference is now made to FIGURE 5 of the drawings which illustrates the circuit of FIGURE 4 when it is connected as a digital to analog converter. Upon the application of each word sync pulse to switches 19 and 26, the capacitors 12 and 13 are discharged from their previous conditions and restored to zero voltage. When the word sync pulse is removed, the constant amplitude voltage derived across Zener diode 22 is applied to capacitors 12 and 13, of equal value, so that the capacitors are charged to voltages equal to $E/2$. If the first bit in a word is a zero, switch 26 is closed, and capacitor 13 is discharged. If, however, the first bit of word is a one, switches 25 and 37 are activated so that the charge across capacitor 13 is transferred to capacitor 35.

When the binary one is terminated, switch 25 again closes and a voltage equal to E is applied to capacitors 12 and 13. The net charge applied is equal to only one-half the charge applied to the previous time switch 25 was closed because capacitor 12 is maintained at a charge commensurate with $E/2$. Accordingly, capacitors 12 and 13 are charged to $¾E$ and $¼E$, respectively. If the next pulse applied to diodes 45 and 46 is a binary one, the charge across capacitor 13 is transferred to capacitor 35 and added to the stored charge therein. Thus, if the first two bits in a word are both ones, capacitor 13 delivers a charge commensurate with $E/2$ to capacitor 35 in response to the first bit and delivers a charge commensurate with $E/4$ to capacitor 35 when the second bit is generated. Capacitor 35 is then charged to a voltage commensurate with $¾E$ subsequent to a pair of binary ones being generated in the first and second bits of a word. The operation is continued throughout the word so the charge accumulated on capacitor 35 is commensurate with the digital value of a particular word.

When the word is complete and a word sync pulse is generated, switch 33 is closed and the charge across capacitor 35 is removed. The output terminal of amplifier 36 is connected to a storage element so that the analog voltage corresponds with the maximum value of the charge stored in capacitor 35 during each word.

Reference is now made to FIGURE 6 of the drawings which discloses a further embodiment of the present invention employed as a function generator of increasing current pulses. The circuit includes a current source 51 connected across a first inductor 52 and a second inductor 53. The inductors 52 and 53 are in separate branch circuits and inductor 53 is connected to the anode of diode 54 which has its cathode connected to the negative terminal of current source 51. A further diode 55 has its anode connected to the junction of inductor 53 and the cathode of diode 54. The cathode of diode 55 is connected to the opposite terminal of inductor 53 via switch 56.

The inductor circuit of FIGURE 6 is the complement of the capacitor circuit of FIGURE 1. Upon the occurrence of each positive current pulse from source 51, inductors 52 and 53, being of equal value, function as equal current or energy dividers. With neither inductor 52 nor 53 conducting current when a first current pulse is derived from source 51, the current through inductors 52 and 53 equals $I/2$, where I is the magnitude of the current pulse. When the current pulse is complete, the current through diode 52 immediately ceases because the impedance seen by the inductor 53 is infinite compared with its own impedance. This is seen since current source 51 presents a very large impedance across inductor 52 and the back impedance of diode 54 is very great. However, inductor 53 sees a substantially zero impedance when the current pulse has terminated. An inductor which applies its current to a substantially zero impedance will have a tendency to maintain the current flowing therein constant. Consequently inductor 53 stores a current equal to $I/2$ between current pulses. When the next current pulse occurs, it must maintain the same current through inductor 53 as previously was flowing in it, $I/2$, while supplying the excess current equally between inductors 52 and 53. Accordingly, current flowing through inductor 52 upon the occurrence of the second pulse is $I/4$ and the current flowing through inductor 53 and diode 54 is $¾ I$. That the current in inductors 52 and 53 is $I/4$ and $¾ I$, respectively, during the second current pulse is seen by considering the effect of the back E.M.F. of inductor 53. Upon the application of the second pulse, inductor 53 presents a back E.M.F. of the same polarity as the voltage between the input terminals of the source. This reduces the net current applied to the circuit and also prevents further conduction through diode 55. The reduced net current is divided equally between inductors 52 and 53 while inductor 53 retains, in addition, the current flowing in it from the previous pulse.

Upon the completion of the predetermined number of current pulses from source 51, switch 56 is opened and the circulating current of inductor 53 between pulses is removed and inductors 52 and 53 are thereby returned to their initial, zero conducting conditions. Thus if the inductors 52 and 53 are high Q coils and the pulse rate of source 51 is properly designed, the currents through inductors 53 and 52 vary in exactly the same manner as the voltages across capacitors 12 and 13, respectively.

The circuit of FIGURE 7 is provided to compensate for the voltage drop in diode 55 when a circulating current is established in inductor 53 between current pulse occurrences of source 51. The voltage drop is compensated for by the inclusion of a further inductor 56 connected in series with the branch circuits which include inductors 52 and 53 but in parallel with diode 55. Thus, inductor 56 does not take any of the current energy supplied by source 51 which would normally be applied to inductors 52 and 53 but adds additional current to that derived from inductor 53 during its discharge cycle. Thereby, the voltage drop and the ensuing decrease in current caused by diode 55 in the current of inductor 53 is compensated. This is seen because inductance 56 will force more current through the loop including inductor 53 and diode 55 than would be supplied by inductor 53 alone.

Reference is now made to FIGURE 8 of the drawings which discloses the manner in which the function generator of FIGURE 7 may be employed as an analog to digital converter. The current pulses for activating coils 52, 53 and 56 are supplied from a battery 61 having its positive terminal connected to the junction of the anode of diode 55 and one terminal of inductor 56 via a relatively large resistance 62 and normally open switch 63. Switch 63 is closed upon each occurrence of a bit from clock pulse source 27.

A pair of Hall plates 64 and 65 are arranged to generate voltages in response to the current flowing in inductors 52 and 53, respectively. The voltage generated by Hall plate 66 is applied to delay circuit 66 having a delay time equal to one-half of a bit derived from clock pulse source 27. The output of delay element 66 is applied to normally open switch 67 which is activated by the output of switch 68. Switch 68, generates a binary one when a bit is derived from clock pulse 27 coincidence with a positive input to its other terminal. The output of switch 68 is coupled to inverter 71 which is enabled each time a clock pulse is generated. Thus, if the output of switch 68 is a binary zero, a binary one is derived as the output of the analog to digital circuit from inverter 71 while the opposite conditions prevail when the output of switch 68 is a binary one.

Comparator 69 which activates switch 68 is responsive to the voltage generated by Hall plate 65 and the output voltage of summing amplifier 72. The input circuit of amplifier 72 is connected to sampling and hold capacitor 35 once each word when switch 33 is closed and to the output of delay element 66 when switch 67 is closed.

Upon the occurrence of a word sync pulse, switch 33 is closed and capacitor 35 is charged to the voltage level of source 34. Simultaneously, switch 63 is closed and inductors 52 and 53 pass currents equal to $I/2$. This results in a voltage being generated by Hall plate 65 commensurate with $I/2$. This voltage is compared with the output of unity amplifier 72, equal in magnitude to the voltage stored by capacitor 35. If the output of amplifier 72 is greater than the voltage generated by plate 65, a binary zero is generated by comparator 69. This binary zero does not enable the clock pulse from source 27 to be applied through gate 68. Accordingly, switch 67 remains open and a binary one is derived from inverter circuit 71. If, however, the output of amplifier 72 is less than the voltage generated by plate 65, a binary one and a binary zero are derived from comparator 69 and inverter 71, respectively.

The binary one from comparator 69 enables switch 68 to pass the clock pulse from source 27. This clock pulse is applied through switch 68 to close switch 67. Switch 67 includes a holding circuit equal to the delay time of element 66 so that the voltage generated in Hall plate 64 is coupled to capacitor 35 between clock pulse occurrences. Then the voltage generated by plate 64, commensurate with one-half the maximum current flowing from the current source, is added to capacitor 35. Switch 67 is open before the occurrence of the next clock pulse so that delay element 66 is isolated from the input of summing amplifier 72. Upon the next occurrence of a clock pulse, capacitor 35 is charged to a level equal to the analog input voltage plus $I/2$. The next clock pulse results in inductors 52 and 53 conducting currents equal to $I/4$ and $\frac{3}{4}I$, respectively. A comparison is again effected between the voltage stored on capacitor 35 and that generated by Hall plate 65 and a binary zero or one is derived from inverter 71 in accordance with the comparison.

Upon the completion of the number of binary bits clock pulses in a word, the number being determined by variable frequency divider 28, pulses are applied to activate switches 56 and 33. Switch 56 is activated to its open condition so that the circulating current in inductors 56 and 53 is immediately removed while switch 33 enables the signal of analog source 34 to be applied to capacitor 35.

While I have described and illustrated one specific embodiment of my invention, it will be clear that variations of the details of construction which are specifically illustrated and described may be resorted to without departing from the true spirit and scope of the invention as defined in the appended claims.

I claim:

1. In a digital to analog or an analog to digital converter wherein control signals are respectively derived in response to digital data input pulses or in response to comparisons between an analog input and a signal level, a system for deriving a signal progressively increasing in amplitude by predetermined decreasing increments comprising a source of constant amplitude energy pulses, means for controlling the duration of said pulses in response to said control signals, means for dividing the energy derived from said source by a predetermined ratio, said last named means comprising a pair of reactances simultaneously activated by said source and storing the energy of said source, and means for removing the energy in one of said reactances between each adjacent ones of said pulses while maintaining the energy in the other of said reactances substantially constant.

2. The system of claim 1 wherein each of said reactances is a capacitor, and said capacitors are connected in series circuit with said source.

3. The system of claim 2 wherein said capacitors are of equal value.

4. The system of claim 1 wherein each of said reactances is an inductor, and said inductors are connected in separate branch circuits with said source.

5. The system of claim 1 including means for periodically removing the energy stored in said other reactance.

6. In a digital to analog or an analog to digital converter wherein control signals are respectively derived in response to digital data input pulses or in response to comparisons between an analog input and a signal level, a circuit for deriving a voltage progressively increasing in amplitude by predetermined decreasing increments comprising a source of constant amplitude voltage pulses, means for controlling the duration of said pulses in response to said control signals, a pair of capacitors connected in series circuit with said source and each other, a first unilateral conducting element for applying said pulses to both of said capacitors while preventing discharge of one of said capacitors between adjacent ones of said pulses, and a second unilateral conducting element for discharging the other of said said capacitors only between adjacent ones of said pulses.

7. The circuit of claim 6 including a further capacitor connected in said series circuit, said second unilateral conducting element connected to discharge said further capacitor only between adjacent ones of said pulses.

8. In a digital to analog or an analog to digital converter wherein control signals are respectively derived in response to digital data input pulses or in response to comparisons between an analog input and a signal level, a circuit for deriving a current progressively increasing in amplitude by predetermined decreasing increments comprising a source of constant amplitude current pulses, means for controlling the duration of said pulses in response to said control signals, a pair of inductors connected in separate branch circuits with said source, a first unilateral conducting element for applying said pulses to one of said inductors while preventing current flow through the other of said inductors between adjacent ones of said pulses, and a second unilateral conducting element for maintaining the current flow through said one inductor between adjacent ones of said pulses substantially equal to the current flow through said one inductor during the preceding one of said pulses.

9. The circuit of claim 8 including a further inductor connected in series circuit with both of said inductors of said pair and in parallel with said second unilateral element.

10. In a digital to analog or an analog to digital converter wherein control signals are respectively derived in response to digital data input pulses or in response to comparisons between an analog input and a signal level, a system for deriving a signal progressively increasing in amplitude by predetermined decreasing increments comprising a constant amplitude source of energy, means for dividing the energy derived from said source by a predetermined ratio, said last named means comprising a pair of reactances for storing the energy of said source, said pair of reactances being simultaneously connected with said source, and means for decoupling said source from said means for dividing while removing the energy in one of said reactances and maintaining the energy in the other of said reactances substantially constant, said last named means being activated in response to said control signals.

11. In a system for converting an analog signal to a digital indication comprising a source of constant amplitude energy pulses, means for dividing the energy derived from said source by a predetermined ratio, said last named means comprising a pair of reactances for storing the energy of said source, said reactances being simultaneously connected with said source, means for removing the energy in one of said reactances between each adjacent ones of said pulses while maintaining the energy in the other of said reactances substantially constant, first and second signals being derived commensurate in amplitude with the energy stored in said one and said other reactances, respectively, and means for adding said first signal to the analog signal when the second signal exceeds said analog signal.

12. The system of claim 11 including means for storing and sampling said analog signal.

13. The system of claim 12 wherein said storing and sampling means comprises a capacitor, said one and other reactances being first and second condensers, respectively, said condensers being connected in series circuit with said source and said means for adding includes means for transferring the charge from said first condenser to said capacitor.

14. The system of claim 11 wherein said reactances comprise first and second inductors connected to said source in separate branch circuits.

15. The system of claim 11 including means for removing the energy from the other of said reactances after a predetermined number of said pulses, said last named means being variable.

16. A system for converting digital signals represented by zeros and ones to analog signals comprising a constant amplitude source of energy, means for dividing the energy derived from said source by a predetermined ratio, said last named means comprising a pair of reactances for storing the energy of said source, said reactances being simultaneously connected with said source, means responsive to each of said zeros and ones for decoupling said source from said means for dividing while removing the energy in one of said reactances and maintaining the energy in the other of said reactances substantially constant, and means for sampling the energy in said one reactance when the digital signal is a one, said sampling means including means for storing a signal commensurate with the sampled energy.

17. The system of claim 16 wherein said energy source is a voltage, said one and other reactances are a first and second capacitors respectively, said capacitors being connected in series circuit with said source, said means for storing comprising a condenser, said means for sampling including means for transferring the charge of said first capacitor to said condenser.

18. The system of claim 16 including means for removing the energy from the other of said reactances upon the occurrence of a predetermined number of zeros and ones, said last named means being variable.

19. A system adapted for use as a converter of analog signals to a digital representation or of digital signals represented by zeros or ones to an analog representation, comprising a constant amplitude source of energy, means for dividing the energy derived from said source by a predetermined ratio, said last named means comprising a pair of reactances for storing the energy of said source, said reactances being simultaneously connected with said source, switching means for decoupling said source from said means for dividing while removing the energy in one of said reactances and maintaining the energy in the other of said reactances substantially constant, first and second signals being derived commensurate in amplitude with the energy stored in the first and second reactances, respectively, an analog signal storage element, first switch means for establishing the system as an analog to digital converter, second switch means for establishing the system as a digital to analog converter, said first switch means including means for coupling the analog signal to said storage element, said first switch means including means for applying the first signal to said storage element when the second signal amplitude exceeds the signal amplitude stored in said storage element, said second switch means includes means for activating said switching means when the digital signal is a zero or one, said second switch means including means for applying the first signal to the storage element when the digital signal is a one.

20. A system adapted for use as a converter of analog signals to a digital representation or of digital signals represented by zeros or ones to an analog representation, comprising a constant voltage source, a first normally open switch connected across said source, a second normally closed switch connected in series circuit with said source, the closing of said first switch resulting in pulses being generated, the series circuit including first and second capacitors series connected with each other and said source, a first unilateral element connected in the series circuit and poled to pass the pulses from said source to said capacitors, while preventing discharge of one of said capacitors between adjacent ones of said pulses, a second unilateral element connected to said capacitors and poled to discharge the other of said capacitors between pulses, a unity gain amplifier, a condenser connected across the input of said amplifier, first switch means for establishing the system as an analog to digital converter including means for applying the analog signal to said condenser, means for connecting the other capacitor between the input and output terminals of said amplifier while opening said second switch when the voltage magnitude across said one capacitor exceeds the voltage magnitude across said condenser, said one capacitor being connected across the amplifier to increase the magnitude of the voltage across said condenser, and means for closing said first switch when the voltage magnitude across said condenser exceeds the voltage magnitude across said one capacitor; second switch means for establishing the system as a digital to analog converter, including means for closing the first switch when the digital signal is a zero, and means for opening the second switch and for connecting the other of said capacitors across the input and output terminals of said amplifier when the digital signal is a one.

21. In a digital to analog or an analog to digital converter wherein control signals are respectively derived in response to digital data input pulses or in response to comparisons between an analog input and a signal level, a system for deriving a signal increasing in amplitude by decreasing increments comprising a source of constant amplitude voltage pulses, means for controlling the duration of said pulses in response to said control signals, a pair of capacitors connected in series with each other and said source of pulses, and means for maintaining the voltage across one of said capacitors constant between the occurrence of said pulses while discharging the other of said capacitors to the voltage of said source between the occurrence of said pulses.

22. In a digital to analog or an analog to digital converter wherein control signals are respectively derived in response to digital data input pulses or in response to comparisons between an analog input and a signal level, a system for deriving a signal increasing in amplitude by decreasing increments comprising a source of constant amplitude voltage pulses, means for controlling the duration of said pulses in response to said control signals, a pair of capacitors connected in series circuit with each other and said source, a first diode connected in said series circuit poled to pass current from said pulses to both said capacitors, and a second diode shunting the series combination of one of said capacitors and said first diodes, said second diode being poled to prevent current from said pulses reaching the other of said capacitors.

23. In a digital to analog or an analog to digital converter wherein control signals are respectively derived in response to digital data input pulses or in response to comparisons between an analog input and a signal level, a system for deriving a signal increasing in amplitude by decreasing increments comprising a source of constant amplitude voltage, a pair of capacitors connected in series circuit with each other and said source, a pair of switches ganged together so that one is opened when the other is closed, one of said switches being connected in said series circuit, the other of said switches being connected in shunt circuit with one of said capacitors, said pair of switches being activated in response to said control signals.

References Cited by the Examiner

UNITED STATES PATENTS

| | | | |
|---|---|---|---|
| 2,729,812 | 1/1956 | Jahn | 340—347 |
| 2,817,704 | 12/1957 | Huntley | 340—347 |
| 3,098,224 | 7/1963 | Hoffman | 340—347 |

MALCOLM A. MORRISON, *Primary Examiner.*